US005298675A

United States Patent [19]

Nishimoto et al.

[11] Patent Number: 5,298,675

[45] Date of Patent: Mar. 29, 1994

[54] ELECTRONIC MUSICAL INSTRUMENT WITH PROGRAMMABLE SYNTHESIZING FUNCTION

[75] Inventors: Tetsuo Nishimoto; Yasuyoshi Nakajima, both of Hamamatsu, Japan

[73] Assignee: Yamaha Corporation, Hamamatsu, Japan

[21] Appl. No.: 951,146

[22] Filed: Sep. 24, 1992

[30] Foreign Application Priority Data

Sep. 27, 1991 [JP] Japan ................................ 3-249876

[51] Int. Cl.[5] ......................... G09B 15/02; G10H 1/06

[52] U.S. Cl. .................................. 84/622; 84/477 R; 84/DIG. 2

[58] Field of Search .......................... 84/618, 622-625, 84/477 R, DIG. 2

[56] References Cited

FOREIGN PATENT DOCUMENTS 58-211784 9/1983 Japan .

*Primary Examiner*—Stanley J. Witkowski
*Attorney, Agent, or Firm*—Graham & James

[57] ABSTRACT

The electronic musical instrument has synthesis means operative according to given tone control parameters for effecting a musical tone synthesis to generate a musical tone. Register means is provided for registering first data of a lower class and second data of an upper class in hierarchical data structure so as to constitute the tone control parameters. The first data is effective, at least, to define a timbre of a musical tone to be generated. The second data designates a plurality of the first data, effective to control the musical tone synthesis according to different timbres which are defined by the plurality of the first data. Edit means is provided for revising selectively the registered first data. Display means is provided for selectively indicating the second data which is associated to the first data to be revised in order for management of the hierarchical data structure.

6 Claims, 10 Drawing Sheets

DATA MEMORY

ELECTRONIC MUSICAL INSTRUMENT WITH PROGRAMMABLE SYNTHESIZING FUNCTION

BACKGROUND OF THE INVENTION

The present invention relates to an electronic musical instrument having musical tone synthesizing function, and more particularly relates to a specific type of the electronic musical instrument constructed to effect synthesis of musical tones according to programable tone control parameters such as timbre data which is inputted and set by a user of the instrument.

As well known, recently there have been developed various types of synthesizers for synthesizing musical tones based on programable tone control parameters set by the user. These types of the synthesizers are constructed such as to generate sophisticated musical tones according to the ton control parameters which are a complex of tone timbre data and tone effect data. The timbre data contains information representative of algorithm of a digital tone generator, characteristic of an envelope generator and so on. The tone synthesis is effected according to these information so as to form a musical tone signal having a specific timbre simulating, for example, piano sound. The effect data contains information used to impart various acoustic effects or variation such as reverberation and delay to the formed musical tone signal.

In such a type of the electronic musical instrument, the above described tone control parameters are divided into upper class data and lower class data in a hierarchical data structure. Namely as shown in FIG. 11, the lower class is comprised of various timbre data stored in a timbre memory VM and various effect data stored in an effect memory EM. On the other hand, the upper class contains performance data comprised of a specific complex of the lower class data, stored in a performance memory PM.

The performance data represents a combination selected from a plurality of timbre data which are set and registered by the user, or represents a combination of timbre data and effect data. The performance data is programed and registered by the user in accordance with a given music performance style. For example, the complex combination indicates a particular setting such that a piano sound and a guitar sound are simultaneously generated during the course of performance, or such that timbre or effect of the generated musical sound is varied in different sections of a keyboard. Namely, the performance memory PM stores various sets of codes of timbre data VM(1)-VM(n) and effect data EM(1)-EM(n) according to the combination information of each performance data.

In practical, as shown in FIG. 12, the hierarchical data structure of the musical tone control parameters are stored such that a sole data memory are divided into three storage areas E1, E2 and E3 which store, respectively, performance data PM(1)-PM(n), timbre data VM(1)-VM(n) and effect data EM(1)-EM(n). The user selects a particular one of the performance data prior to the performance operation so that particular timbre data and effect data designated in the selected performance data are retrieved from the data memory to effect musical tone synthesis responsively.

Normally, the electronic musical instrument having the above noted hierarchical data structure is provided additionally with function to edit o revise the upper and lower class data. This edit function is utilized to revise a content of the previously programed data or to set new data. For example, in order to revise a content of a certain timbre data adopted in a given performance data, this timbre data is edited in the lower class level of the data structure to which the object timbre data belongs. However, in editing of the lower class data within the hierarchical data structure of the timbre data and the performance data associated with each other as shown, for example, in FIG. 13, if the timbre data VM(3) involved in a performance data PM(1) is to be revised or modified by the editing operation, another performance data PM(3) is affected by this editing operation because the latter performance data PM(3) commonly shares the timbre data VM(3) with the former performance data PM(1). The same is true in case that those of the performance data PM(2), PM(4) and PM(35) are affected concurrently by the revision of a commonly shared timbre data VM(6). As described, in the conventional electronic musical instrument, without regard to the associative or hierarchical relation between the upper class data and the lower class data, the lower class data adopted duplicately in a multiple of the upper class data may be uniformly revised, thereby causing the problem that an unintended upper class data might be inadvertently rewritten.

SUMMARY OF THE INVENTION

In view of the above noted problem of the prior art, an object of the invention is to prevent unintended rewriting of the upper class data due to revision of associated lower class data in the hierarchical data structure of the programable musical sound synthesizer. According to the invention, the electronic musical instrument is constructed to perform musical tone synthesis according to given tone control parameters. The instrument is provided with register means for registering the tone control parameters in the form of a group of first data effective to define, at least, timbre of musical tones to be generated, and another group of second data each representative of a selected combination or a complex of the first data, effective to conduct or control the musical tone synthesis according to different timbres which are defined by the combination of the first data. The instrument further includes edit means for editing or revising the first data and display means for indicating all of the second data which share commonly the edited first data.

In the inventive construction of the electronic musical instrument the lower class of the first data is utilized to define, at least, timbre of tone elements to be generated, and the upper class of the second data is formed of a complex of the first data and is effective to control the musical sound synthesis in accordance with a given performance style. When the first data is revised, all of the second data associated to the revised first data are extracted and displayed so as to indicate the complex relation between the first and second data. The user can improve, organize or manage, the overall hierarchical data texture during the course of the editing operation.

DETAILED DESCRIPTION OF THE INVENTION

Figure 1:
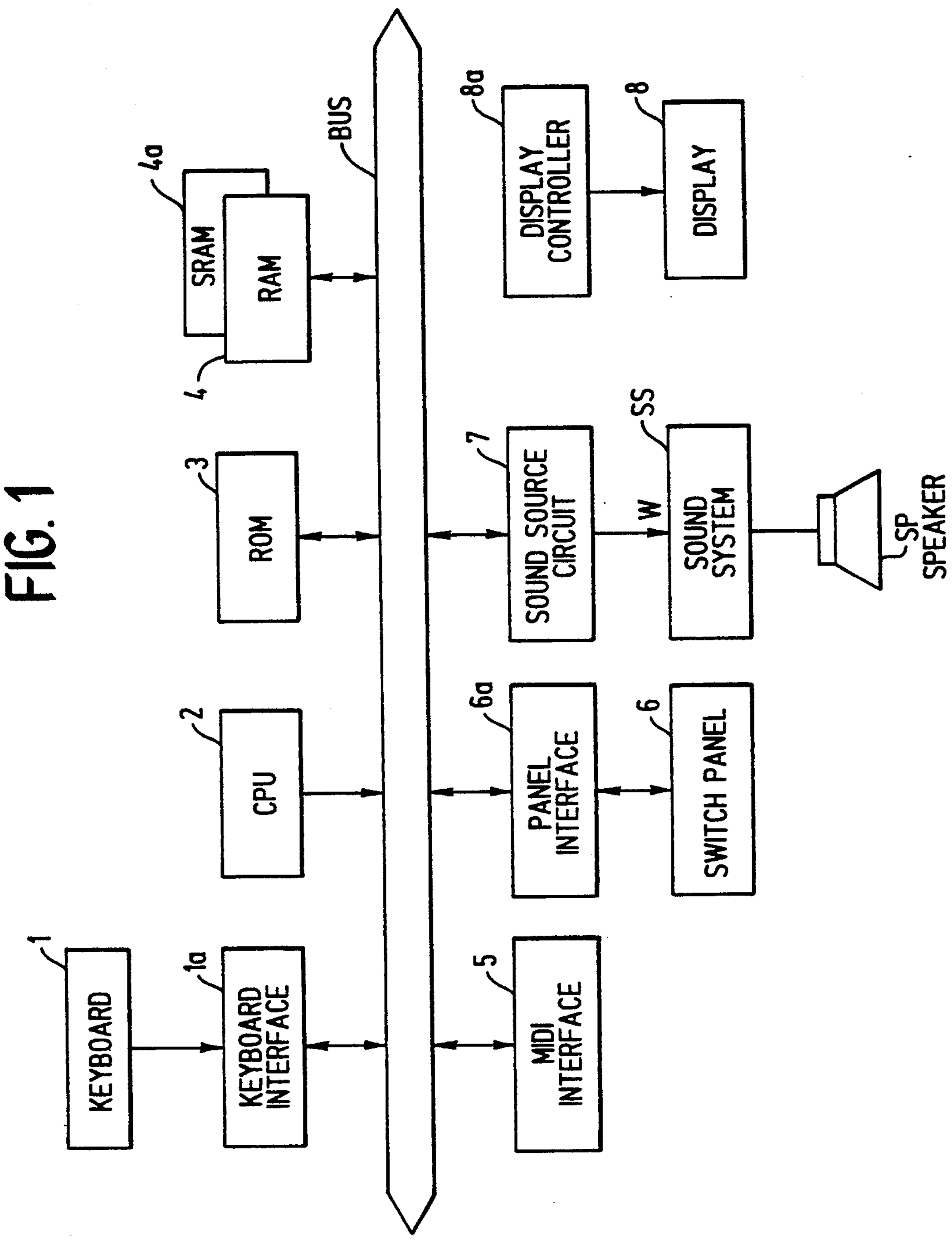
FIG. 1 is a block diagram showing a basic construction of one embodiment according to the invention.

Hereinafter, embodiments of the present invention will be described in conjunction with the drawings. FIG. 1 is a block diagram showing the overall construction of one embodiment of the inventive electronic musical instrument. In the figure, the instrument includes a keyboard 1 provided with a mechanism for detecting depression and release operation of each key and detecting a velocity of the key depression and release to thereby generate signals corresponding to the depression/release key event and the depression/release velocity. A keyboard interface 1*a* is provided to operate in response to the various signals fed from the keyboard 1 so as to generate tone pitch information, Musical Instrument Digital Interface (MIDI) channel data, key-depression velocity signal and key-release velocity signal. The MIDI channel data may be set individually each key, but generally the MIDI channel data is determined uniquely for all of the keys.

A CPU 2 is provided in the electronic musical instrument so as to control various parts thereof. Operation thereof will be described later in detail. A ROM 3 is provided to store various control programs loaded in the CPU 2 and various data tables utilized in processing of the control programs. A RAM 4 is also provided to temporarily store various computation results outputted from the CPU 2 and various register values used in the CPU 2. This RAM 4 is composed partly of a static RAM or SRAM 4*a* which can keep memorized contents by battery backup. The SRAM 4*a* stores or registers the before mentioned timbre data, effect data and performance data in the hierarchical format or structure. An MIDI interface 5 is provided to carry out a signal transfer to and from another electronic musical instrument connected through MIDI terminals. A switch panel 6 is mounted on a body of the electronic musical instrument and is provided with various manipulation switches including a voice switch for selecting timbre data, a performance data selecting switch, a mode selecting switch, a character input switch and a ten-key switch. A panel interface 6*a* is connected to generate an operation signal in response to the manipulation on the switch panel 6.

A sound source circuit 7 is comprised of tone generators operative according to the known waveform memory addressing method so as to effect musical tone synthesis based on the various signals fed from the CPU 2 through a data bus to produce a musical sound signal W. A display 8 is composed of, for example, a liquid crystal display device (LCD). The display 8 indicates visually correspondence or link relation between upper class data and lower class data of the hierarchical texture, which will be described later in detail. A display controller 8*a* is connected to receive display data from the CPU 2 through the data bus so as to reproduce the display data on the display 8. A sound system SS is connected to the sound source circuit 7 to filter the sound signal W, to eliminate noises and to impart acoustic effects, and thereafter the shaped sound signal W is fed to a speaker SP to thereby reproduce a musical sound.

Figure 2:
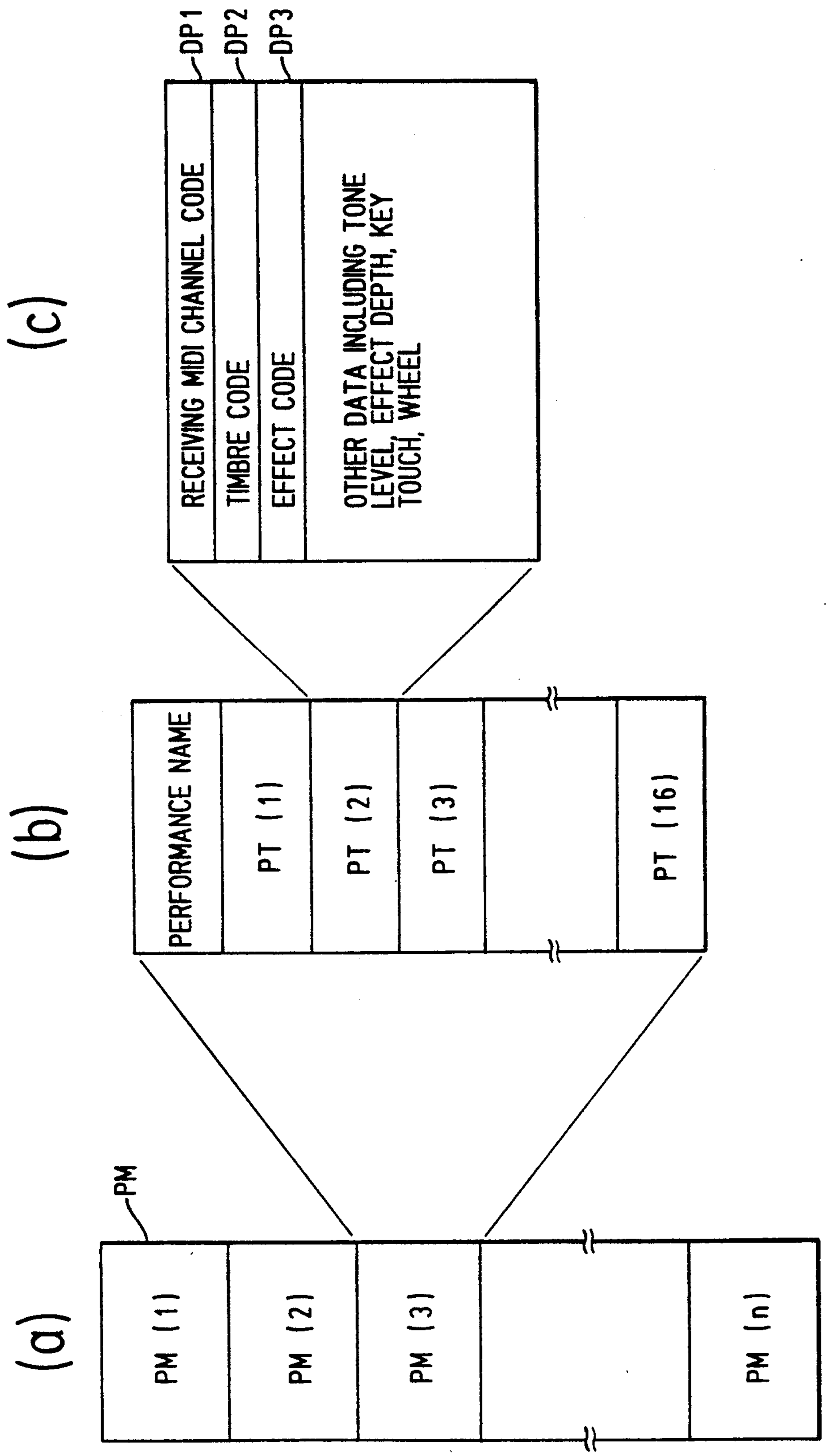
FIG. 2 is a memory map illustrating a structure of a performance memory provided in the embodiment.
Figure 3:
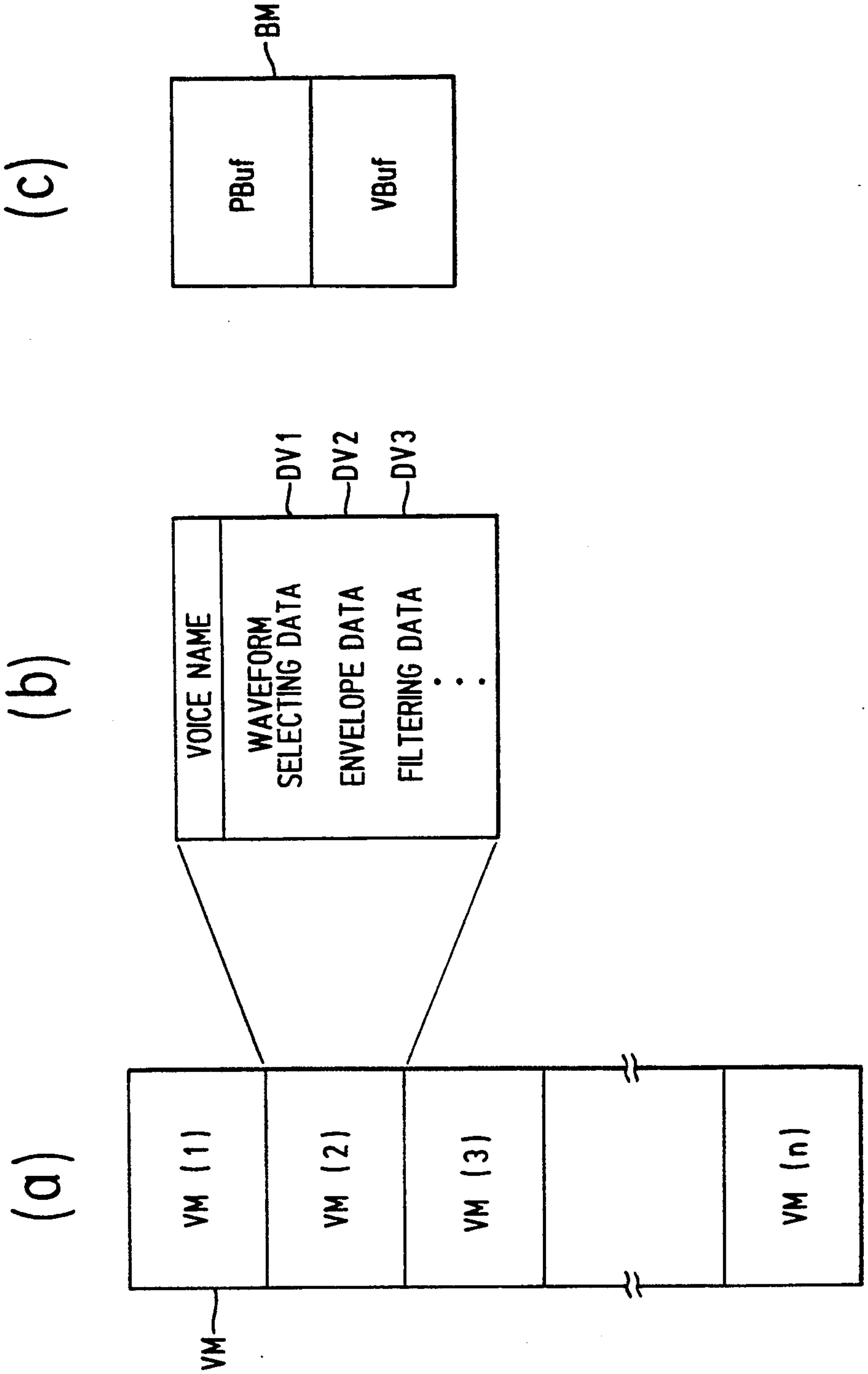
FIG. 3 is a memory map illustrating a structure of a timbre memory provided in the embodiment.

Next, referring to FIGS. 2 and 3, the description is given for the internal structure of the SRAM 4*a*. A part (a) of FIG. 2 shows a memory map of the performance memory PM stored with performance data. As shown in the figure, the memory PM registers a plurality of performance data PM(1)–PM(n) which are programed and reserved by the user correspondingly to various performance styles. As shown in a part (b) of FIG. 2, each of performance data contains a performance name defined by the user and inputted by actuation of the character switch on the switch panel 6, and a set of sixteen number of tone control parameters PT(1)–PT(16). As shown in a part (c) of FIG. 2, each tone control parameter is comprised of a receiving MIDI channel code DP1, a timbre code DP2, an effect code DP3 and other data. The receiving MIDI channel code DP1 is used such as to selectively designate the tone control parameters PT(1)–PT(16) which contain the common receiving MIDI channel code DP1 corresponding to a particular MIDI channel code contained in a transmitted MIDI signal through the MIDI interface 5 or corresponding to an MIDI channel code generated in the keyboard interface 1*a*, thereby generating musical sounds. If there are a plurality of the receiving MIDI channels corresponding to the transmitted MIDI channel data, a plurality of musical tones are concurrently sounded according to a plurality of the designated tone control parameters. The timbre code DP2 is used to address a registered timbre data. The effect code DP3 is used to address a registered effect data. The other data may include a tone volume level and a depth of acoustic effect (application degree of effect).

A part (a) of FIG. 3 shows a memory map of the timbre memory VM stored with the timbre data. As shown in the map, the memory VM memorizes a plurality of timbre data VM(1)–VM(n) which determine a timbre of a generated musical tone. These timbre data VM(1)–VM(n) are addressed by the timbre code DP2. Each timbre data includes a voice name denoting a specific kind of timbre, a waveform selecting data DV1, an envelope data DV2, a filtering data DV3 and so on. This waveform selecting data DV1 is used to retrieve a waveform of a designated timbre from a waveform memory (not shown in the figure). The envelope data DV2 is used to effect envelope control according to the designated timbre. Further, the filtering data DV3 sets a filtering characteristic applied according to the designated timbre. Namely, this timbre memory VM memorizes information for each timbre in order to form a tone signal of the respective timbre. In addition, the acoustic effect data is also memorized in manner similar to the timbre data.

Next, a part (c) of FIG. 3 is a memory map showing an internal structure of a buffer memory BM provided in a given working area of the SRAM 4*a*. As shown in the figure, the performance data selected by the user is retrieved from the performance memory PM, and is then transferred to the performance data buffer PBuf. Then, the timbre data involved in the transferred performance data is read out from the timbre memory VM. The retrieved timbre data is transferred to the timbre data buffer VBuf.

Next, the operation of the above constructed embodiment is described in conjunction with FIGS. 4–7. Firstly, the main routine operation is described, and then further description is given for the edit process of the performance data and the timbre data. With regard to the main routine operation, firstly when the electronic musical instrument is powered, CPU 2 is loaded with a control program stored in the ROM 3 to initiate the main routine shown in FIG. 4. When the main routine is started, the processing of the CPU 2 proceeds to Step Sa1. In this step, initialization is carried out to reset various registers and flags, thereby advancing to next Step Sa2. In this step, key event process is undertaken in order to carry out sounding/silencing operation in response to key depression/release event by the user.

Next, Step Sa3 is undertaken to carry out mode designation process. In this mode designation process, the switch panel 6 is actuated to set a particular voicing mode and an editing mode. The mode selecting switch is operated to set a particular mode so that associated data is transferred to either of the performance data buffer PBuf or the timbre data buffer VBuf. Next Step Sa4 is undertaken to check as to whether the voicing mode set in the above mode designating process is a timbre voicing mode or a performance voicing mode. Hereinafter, the operation will be described for each voicing mode.

In case of the timbre voicing mode, the processing advances to Step Sa5 where the sound source circuit 7 is fed with the timbre data stored in the timbre data buffer VBuf in response to a key event signal detected in the above described key event process (Step Sa2) or in response to an MIDI receiving event, thereby effecting musical tone synthesis to generate musical sound of the object timbre. Next, Step Sa6 is undertaken to check as to if the editing mode has been established. In case that the editing mode has not been set in preceding Step Sa3, the check result is held NO, thereby advancing to next Step Sa7.

Step Sa7 is undertaken to effect timbre selecting process. In this process, the previously set timbre data is changed to a newly selected timbre data. The thus selected timbre data is retrieved from the timbre memory VM in Step Sa8, and is copied into the timbre data buffer VBuf. By this, the timbre data is newly loaded in the timbre data buffer VBuf for use in the musical tone synthesis. Next, Step Sa9 is undertaken to carry out other processings such as reverberation or delay effect is applied to the formed musical sound signal, thereafter returning to the key event process.

On the other hand that the editing mode has been set, the check result of Step Sa6 is held YES to thereby advance to Step Sa10. In Step Sa10, edit process is carried out to edit or revise the timbre data stored in the timbre data buffer VBuf according to various edit modes. Then, Step Sa11 is undertaken to carry out timbre store process such that the timbre data revised by the edit process is registered in the timbre memory VM (The detail will be described later). Then, the processing returns to Step Sa2 through Step Sa9 to repeat the same routine.

In case that it is held in Step Sa4 that the voicing mode is set to the performance voicing mode, the processing branches to Step Sa12. In this step, the sound source circuit 7 is applied with the performance data which is latched in the performance data buffer PBuf in response to a key event or an MIDI receiving event to thereby effect musical sound synthesis for performance sound generation. Next, Step Sa13 is undertaken to check as to if the editing mode has been set. In case that the editing mode has not been set, the check result is held NO, thereby advancing to Step Sa14.

In Step Sa14, performance selecting process is carried out. In this process, a previously set performance data is changed to a newly selected performance data. The thus selected performance data is retrieved from the performance memory PM, and is copied into the performance data buffer PBuf in Step Sa15. By this, the performance data is newly stored in the performance data buffer PBuf for use in the musical sound synthesis. Thereafter, the processing returns to Step Sa2 through the before described Step Sa9 to thereby repeat the above described routine.

On the other hand that the editing mode has been set, the check result of Step Sa13 is held YES, thereby advancing to Step Sa16. In Step Sa16, edit process is carried out to edit or revise the performance data stored in the performance data buffer PBuf according to various edit manner. Next, in Step Sa17, subsequent edit process is undertaken to revise a timbre data involved in the object performance data after completion of editing thereof. Then, in next Step Sa18, performance store process is undertaken to store or register the edited results of Steps Sa16 and Sa17 Thereafter, the processing returns to Step Sa2 through Step Sa9, thereby repeating the above described routine.

As described above, the main routine is executed to generate musical tones formed according to either of the timbre voicing mode and the performance voicing mode. Further, when the edit mode is called in these voicing modes, the edit process is executed. Namely when the timbre voicing mode is called, the timbre data of the lower class is edited. On the other hand that the performance voicing mode is called, the performance data of the upper class is edited. Thereafter, the detailed description is given for the timbre store process (Step Sa11) and the timbre edit process (Step Sa17) after the edition of the performance data, those of which are characterizing operation of the inventive electronic musical instrument.

Figure 5:
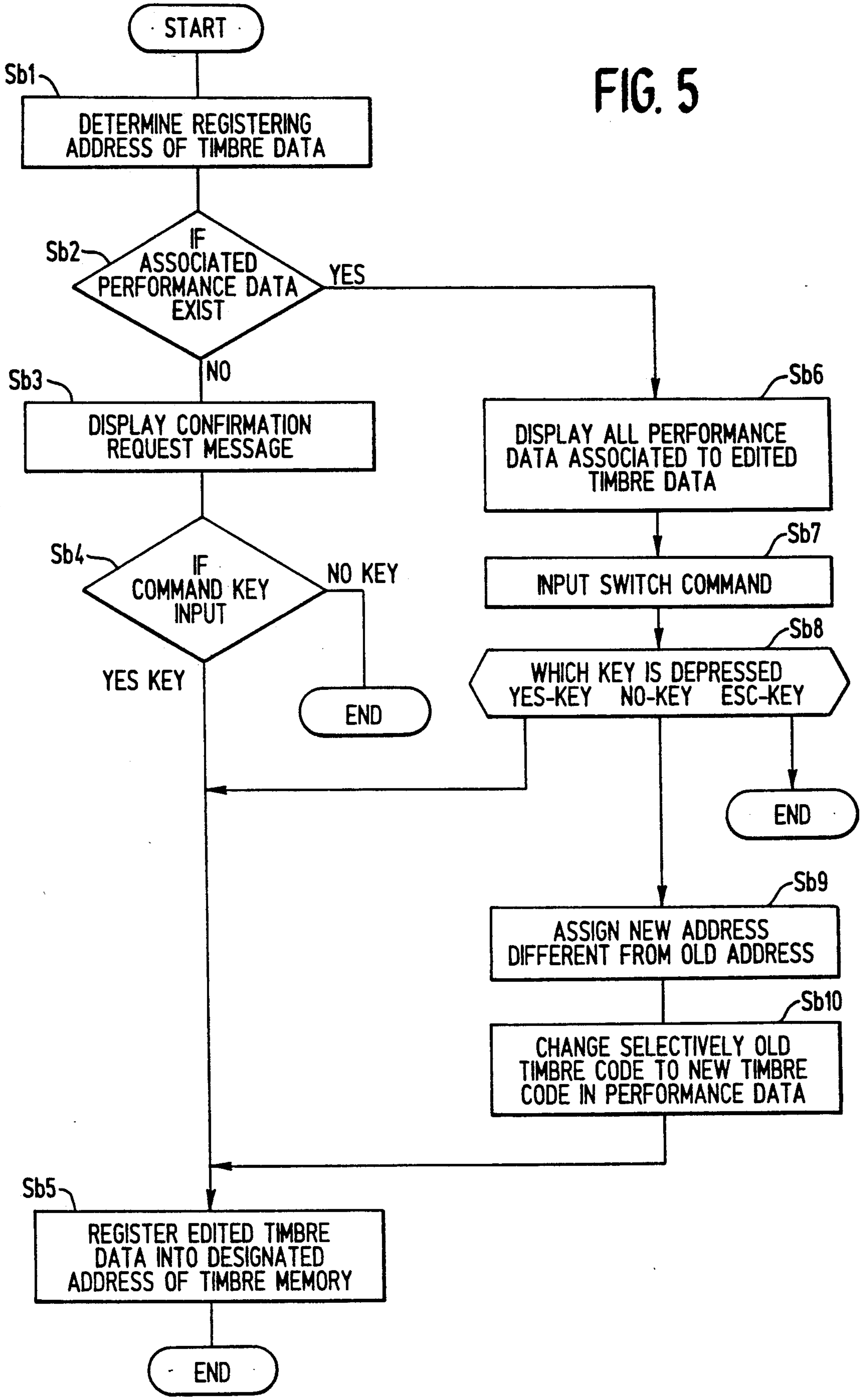
FIG. 5 is a flowchart showing a timbre data storing process routine executed in the embodiment.

With regard to the timbre store process, after the edition of the timbre data, the processing of the CPU 2 advances to Step Sa11 as described before and the timbre store process is started to initiate Step Sb1 of FIG. 5 flowchart. In Step Sb1, in order to store the edited timbre data into the timbre memory VM, a timbre memory address is determined to designate a registering location of this timbre data. Namely, the timbre memory address of the edited timbre data is assigned as a recording location, thereby advancing to Step Sb2.

In Step Sb2, check is made as to whether there is a performance data which utilizes the edited timbre data. In case that there is no performance data which commonly utilizes the timbre data, the check result is held NO to thereby proceed to next Step Sb3. In Step Sb3, the confirmation request message "Are you sure?" is displayed. In next Step Sb4, check is made as to if a command key operation is executed by the user in response to the confirmation request message. Namely, when the user operates an YES-key on the switch panel in response to the confirmation request message, this operation is detected to thereby proceed to Step Sb5. On the other hand that the user operates a NO-key on the switch panel, the processing is stopped so that the writing or storing of the timbre data is not effected, thereby returning to the main routine.

Figure 6:
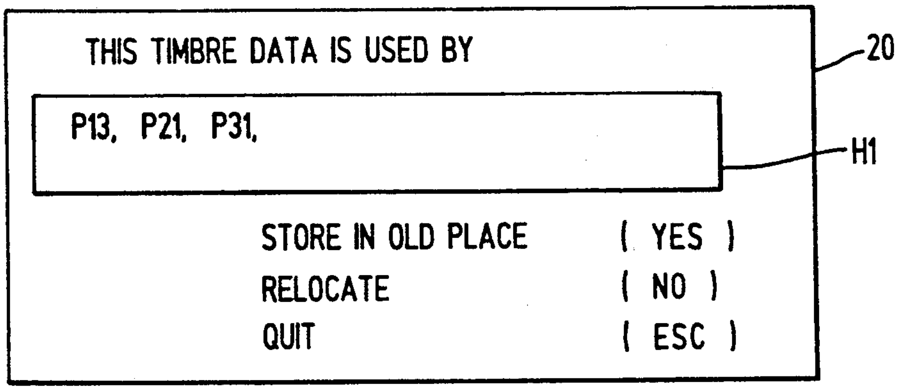
FIG. 6 is a plan view showing a display provided in the embodiment.

In Step Sb5, the edited timbre data is written into the designated address of the timbre data memory. This edited timbre data is that latched and revised in the timbre data buffer VBuf. By this manner, in case that the timbre data revised in the buffer VBuf is not utilized for any of the performance data, the timbre data is uniquely registered back into its original address. On the other hand that the revised timbre data is utilized in some of the performance data, the check result of Step Sb2 is held YES, thereby proceeding to Step Sb6. In Step Sb6, the display unit 8 is activated to indicate a list of all the performance data which utilize the revised timbre data, in the form of, for example, FIG. 6. In this displayed list, all the performance data which involve commonly the revised timbre data are indicated in a display window H1 on the display panel 20. For example, in this display format, it is indicated that three of the performance data P13, P21 and P31 utilize commonly the revised timbre data. In this manner, Step Sb6 is carried out to indicate all the performance data which share commonly the revised timbre data so as to call attention of the user when registering the revised timbre data. In next Step Sb7, command switch keys are operated by the user based on the displayed instruction. In this key operation, as shown in FIG. 6, the YES-key may be actuated when storing the timbre data into the old timbre data address to effect rewriting. Alternatively, the NO-key may be depressed when changing the address of the timbre data to relocate the same. Further, an ESC-key may be depressed when suspending the revision of the object timbre data. Then, in next Step Sb8, the processing is branched according to these switch key operations. For example, when the YES-key has been depressed, the processing goes to the before mentioned Step Sb5 to thereby effect rewriting of the object timbre data. alternatively, when the ESC-key has been depressed, the processing is finished without effecting the registration of the timbre data. In case of newly registering the revised timbre data into a new data location while reserving the original timbre data, the NO-key is operated to thereby proceed to next Step Sb9. In this Step, a new address of the revised timbre data is assigned differently from that of the original timbre data to store the revised timbre data into the new address separately. In this assignment, all the addresses of the timbre data memory are searched by the CPU 2 to select a vacant address for the new timbre data location. If there is no vacant address, the timbre data memory may be sequentially searched to pick up those of the timbre data which are not utilized in the remaining performance data. One of these timbre data is selected and deleted, and the revised timbre data is overwritten in place of the deleted timbre data.

The processing advances to next Step Sb10 so as to carry out assignment or coding of the revised timbre data to the respective performance data indicated in the display area H1 of FIG. 6. In this assignment operation, for example, the pair of YES-key and NO-key can be selectively depressed to determine whether the revised timbre data should be adopted for each of the indicated or listed performance data. Alternatively, a cursor is shifted by operation of a given key to select performance data to be assigned, and then the YES-key is actuated to designate that performance data. By this manner, each of the displayed performance data is grouped into either of one which utilizes the old timbre data and another which utilizes the newly revised timbre data. After completion of the assignment, the processing goes to the before mentioned Step Sb5 such that the original timbre data is registered as it is in the old address, while the revised timbre data is registered in the new address separately.

Figure 4:
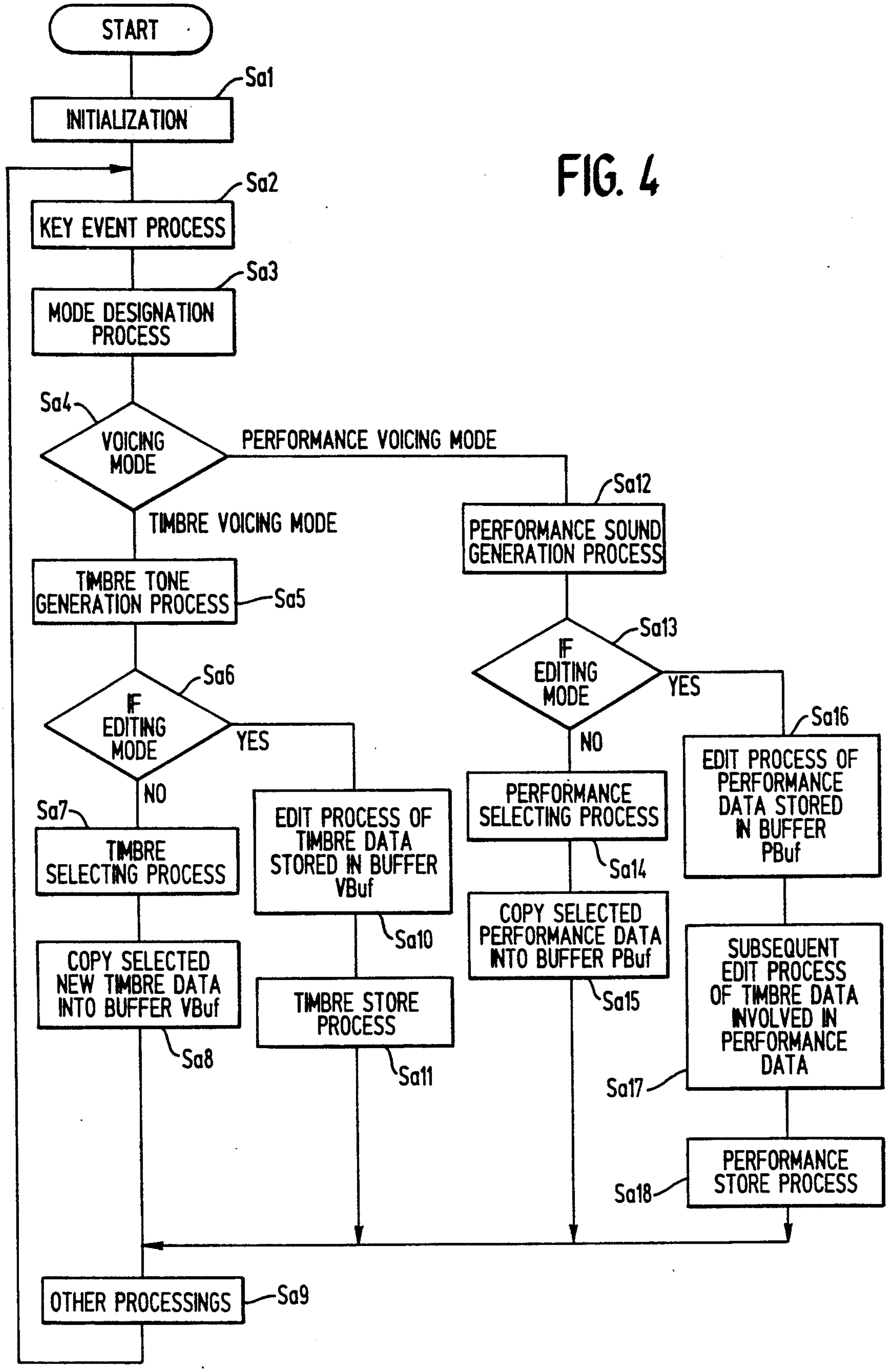
FIG. 4 is a flowchart showing a main routine executed in the embodiment.

The performance store process of Step Sa18 of FIG. 4 is executed in manner similar to the above described timbre store process except for the process of Step Sb2. Namely, while the check is made as to if there is any performance data which utilizes the edited timbre data in the timbre store process, different check is made as to if there is another performance data which commonly utilizes the edited timbre data in the performance store process.

Figure 7:
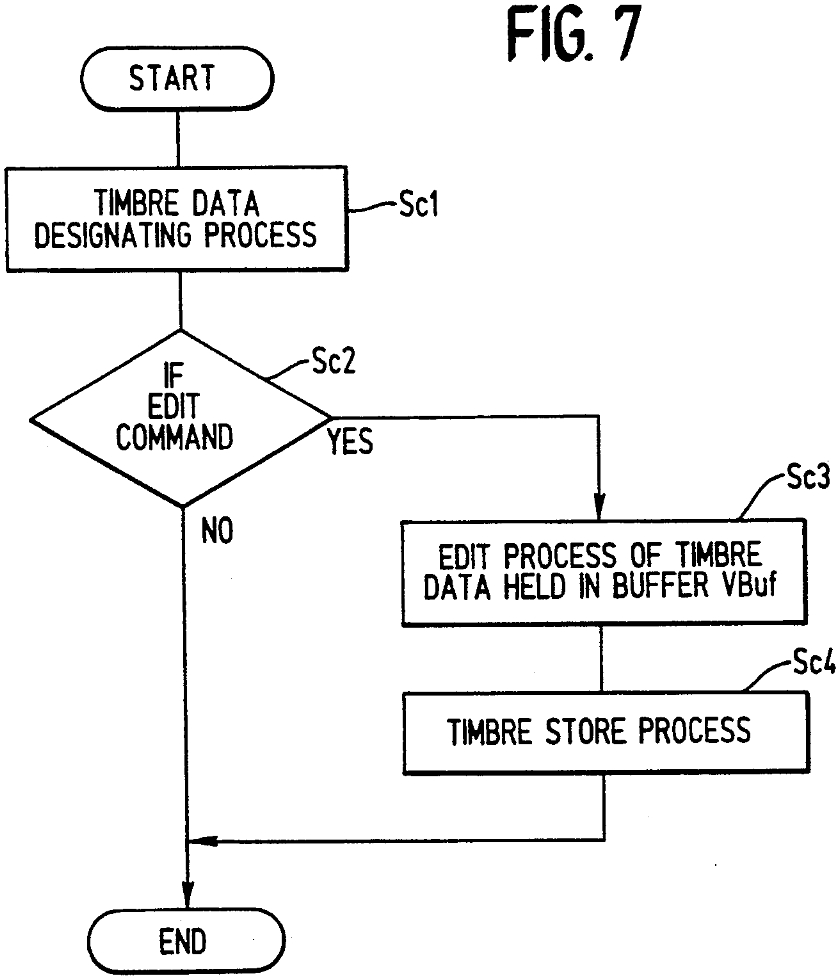
FIG. 7 is a flowchart showing a timbre data editing process routine executed in the embodiment.

With regard to the subsequent timbre edit process of FIG. 4, Step Sa17 is undertaken in case of editing the timbre data adopted in the object performance data to thereby initiate the subsequent timbre edit process. As shown in FIG. 7, when the timbre edit process is started, the process proceeds to Step Sc1. This step is undertaken to carry out timbre data designating process. In this process, a particular one of the timbre data is selected for edition from those adopted in respective voice parts PT1-PT16 (FIG. 2 part (b)) of the object performance data. The designated timbre data is transferred to the timbre data buffer VBuf. Next Step Sc2 is undertaken to judge as to if there is any switch event to designate a given timbre mode. In case that no switch event has occurred, the check result is held NO, thereby finishing this process routine. On the other hand that any switch event has occurred to designate the timbre mode, the check result is held YES to thereby proceed to Step Sc3. This step is executed so as to apply a given edit operation to the timbre data which has been transferred to the timbre data buffer VBuf, thereby proceeding to next Step Sc4. In this step, the timbre store process is carried out in manner similar to Step Sa11 of FIG. 4, detail of which has been described above in conjunction with FIG. 5.

As described above, according to the inventive electronic musical instrument, when the timbre data of the lower class is edited and the edited result is registered in the memory, the display is operated to indicate all the performance data of the upper class which share commonly the edited timbre data in order to call attention of the user. Further, a new registering location is designated for storing the edited timbre data separately from the original timbre data. Consequently, the instrument can avoid unintended alteration of the upper class data due to registration of the edited lower class data in contrast to the prior art.

Figure 8:
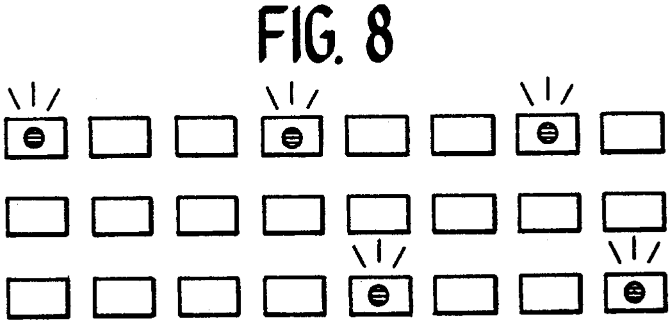
FIG. 8 is a schematic diagram showing a display example indicative of relationship between upper and lower class data in the embodiment.
Figure 9:
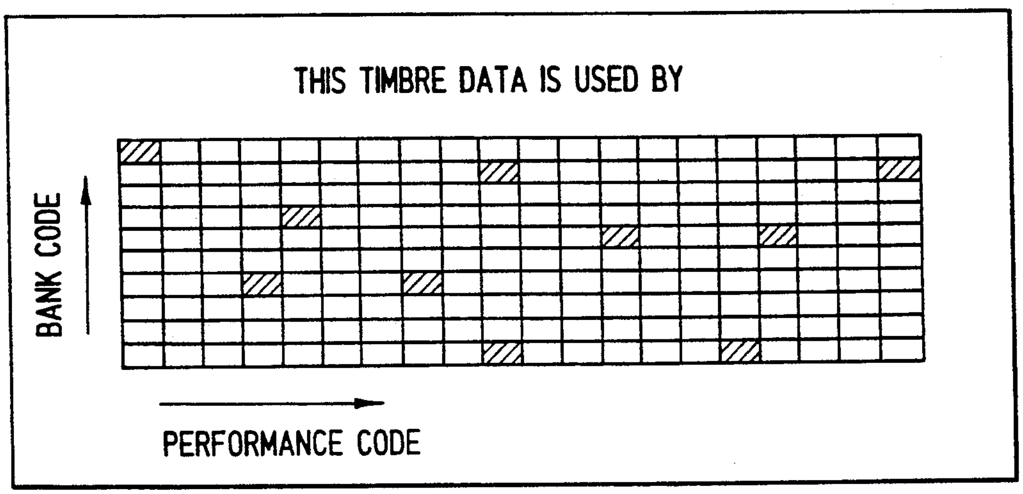
FIG. 9 is a schematic diagram showing another display example.
Figure 10:
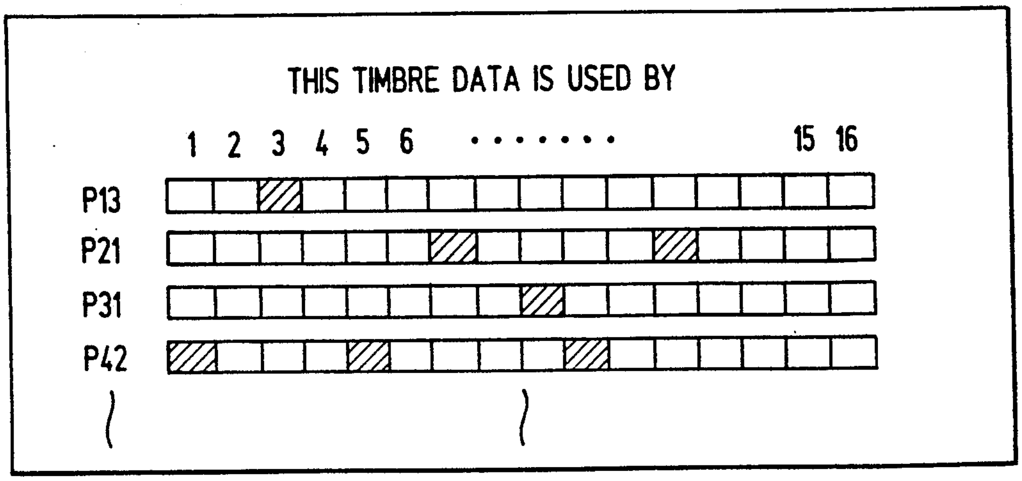
FIG. 10 is a schematic diagram showing a further display example.
Figure 11:
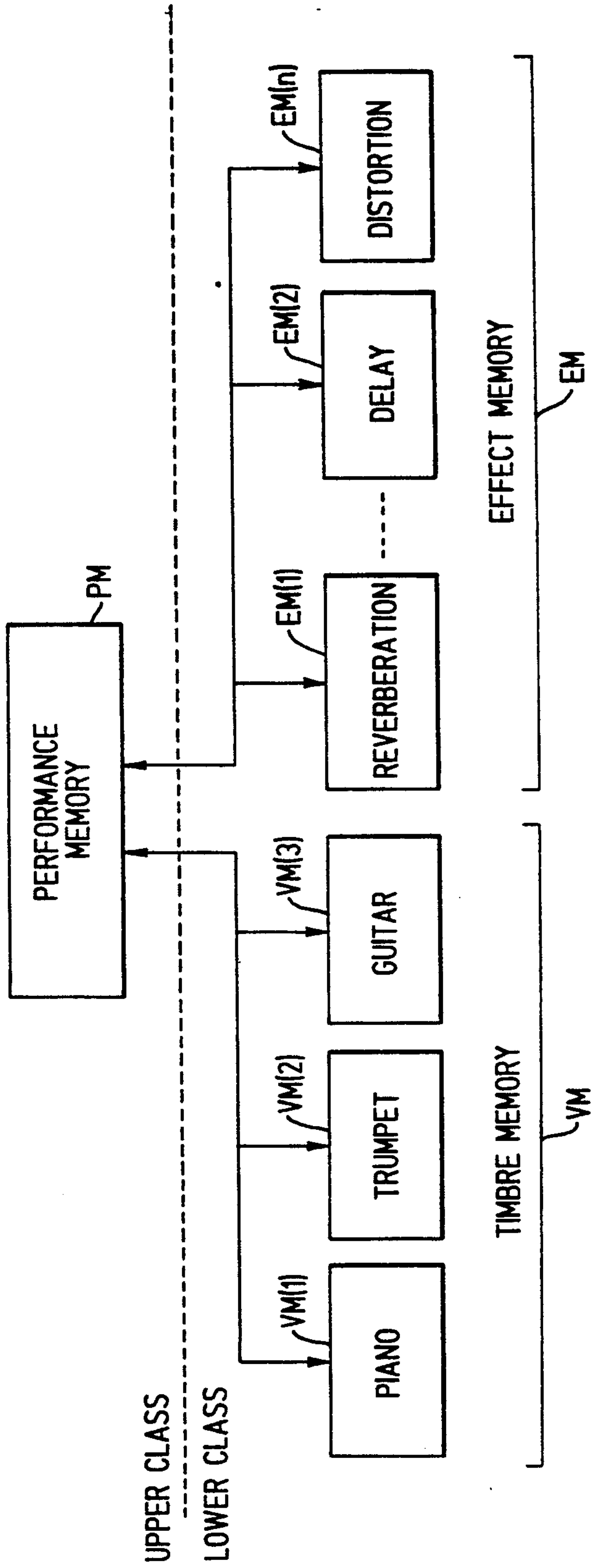
FIG. 11 PRIOR ART
FIG. 11 is an illustrative diagram of the prior art.
Figure 12:
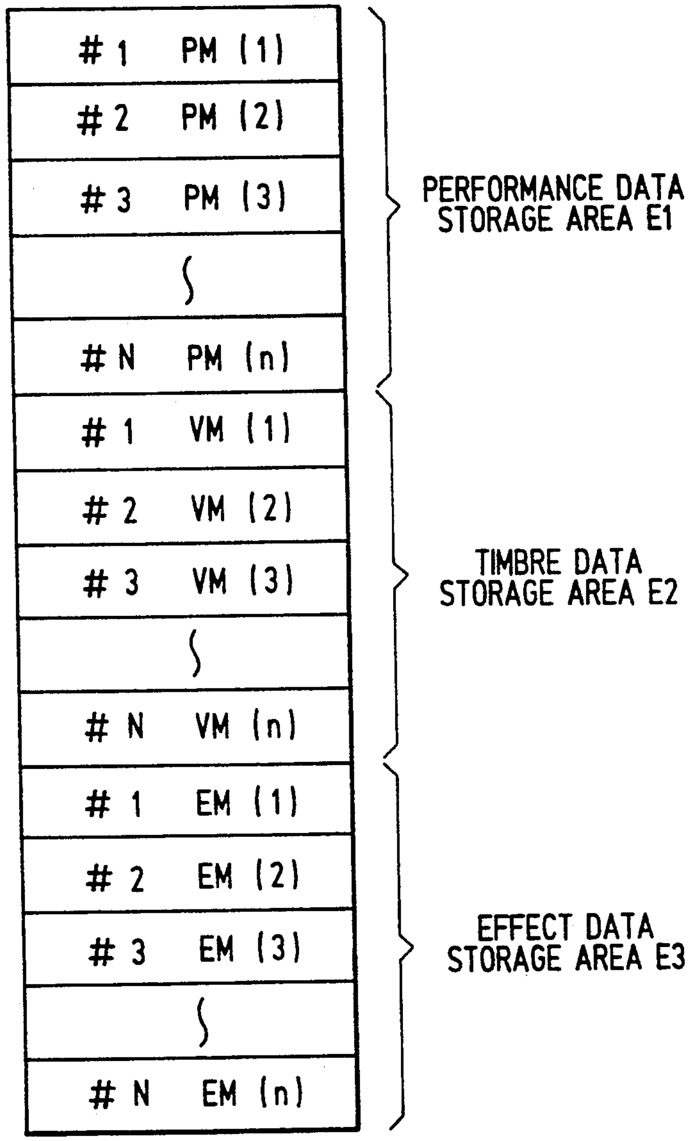
FIG. 12 PRIOR ART
FIG. 12 is another illustrative diagram of the prior art.
Figure 13:
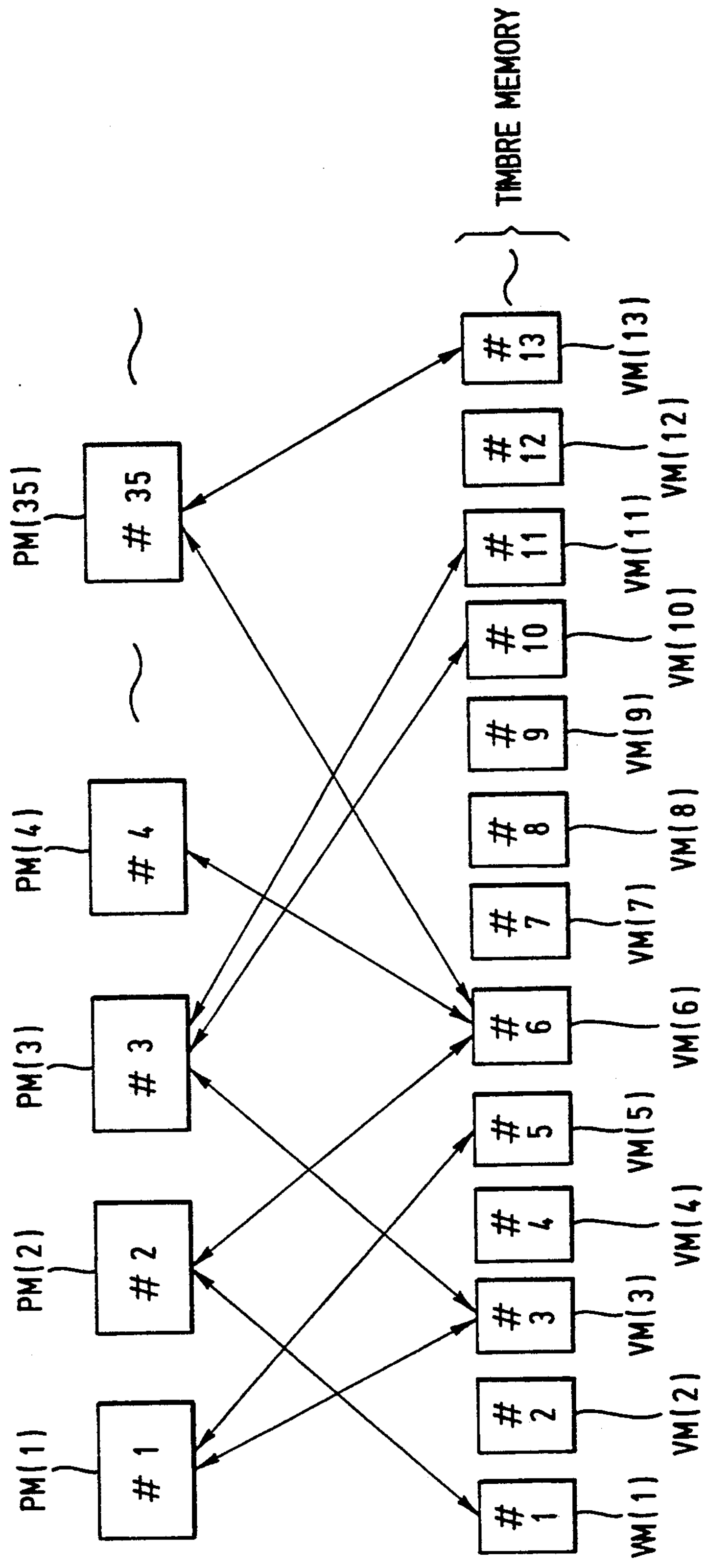
FIG. 13 PRIOR ART
FIG. 13 is a further illustrative diagram of the prior art.

In the above described embodiment, the list format of FIG. 6 is utilized to display the involved performance data which share the object timbre data. However, the display format is not limited to the FIG. 6 list pattern, but performance memory data PM(1)-PM(n) or performance names may be indicated. Further as shown in FIG. 8, a plurality of performance data selecting switches may be selectively lighted to visually indicate the involved group of performance data. Alternatively, a free diagram may be displayed as the FIG. 13 format to show the hierarchical relationship between the lower class data and the upper class data. In addition, other formats may be employed such as shown in FIGS. 9 and 10. In the FIG. 9 display format, a matrix is utilized such that each performance data code PM(1)–PM(n) is indicated at each column, and each musical tone parameter PT(1)–PT(16) which constitutes collectively a so-called bank is indicated at each row to form a map of the performance memory. In this map, selected bits of the matrix elements are discriminated to show correspondence to the object timbre data. In the FIG. 10 format, each of the involved performance data is displayed in a bar code format, and each bar code includes sixteen segments of tone control parameters PT(1)–PT(16). Particular segments are illuminated to show the association to the object timbre data to be revised. These various formats may be utilized to select lower class data such as timbre data and effect data for revision besides the storing operation of the memory.

As described above, according to the invention, the first data of the lower class is used for determining, at least, timbre of musical tones to be generated, and the second data of the upper class is comprised of a complex of the first data for controlling the musical sound synthesis according to various music styles. When the first data is revised, the display is operated to selectively indicate the second data which utilizes the first data to be revised, thereby showing the hierarchical relation between the lower class and the upper class.

What is claimed is:

1. An electronic musical instrument comprising: synthesis means operative according to given tone control parameters for effecting a musical tone synthesis to generate a musical tone; register means for registering first data of a lower class and second data of an upper class in hierarchical data structure so as to constitute the tone control parameters, the first data being effective, at least, to define a timbre of a musical tone to be generated, the second data designating a plurality of the first data, effective to control the musical tone synthesis according to plural timbres which are defined by said plurality of the first data; edit means for revising selectively the registered first data; and display means for selectively indicating the second data which is associated to the first data to be revised in order for management of the hierarchical data structure.

2. An electronic musical instrument according to claim 1; wherein the register means includes means for registering the revised first data in a memory location separately from an original version of the first data when the display means indicates that the first data is shared commonly by a plurality of the second data.

3. An electronic musical instrument according to claim 1; wherein the register means includes means for determining as to whether each of the indicated second data should adopt the revised first data in place of an original version of the first data.

4. An electronic musical instrument according to claim 1; wherein the display means comprises means for selectively indicating the second data in the form of a list which indicates those second data associated to the first data to be revised.

5. An electronic musical instrument according to claim 1; wherein the display means comprises means for selectively indicating the second data in the form of a tree diagram showing diagramatical association between the second data and the first data.

6. An electronic musical instrument according to claim 1; wherein the register means includes means for storing the first data containing timbre information and acoustic effect information so as to determine both of timbre and effect of a musical tone.

* * * * *